Patented Dec. 3, 1929

1,737,888

UNITED STATES PATENT OFFICE

DONALD H. McINTOSH, OF SALT LAKE CITY, UTAH, ASSIGNOR OF ONE-HALF TO GEORGE LESLIE OLDRIGHT

TREATMENT OF ORES

No Drawing.      Application filed December 24, 1926.   Serial No. 156,987.

This invention relates to the treatment of ores and has for its object the provision of certain improvements in the method of treating ores. More particularly, the invention aims to provide an improved method of removing impurities, mainly sulphides of other metals, from tin ores.

There exist various metallurgical products that are not now marketable, due chiefly to the presence of sulphides of iron accompanied by other sulphides which by reason of their fineness of dissemination, similarity of specific gravity, and of the adhesion of these sulphides of iron to other more valuable materials are difficult to separate by ordinary methods of concentration. Among these metallurgical products are those made in the treatment of complex tin ores. Owing to the purity of the concentrate demanded by the various tin smelters, and to a lesser extent to increased cost of freight, it is not considered at the present commercially feasible to ship low-grade products. To supplement milling methods various leaching schemes are employed. No generally economically successful leaching schemes have been devised to my knowledge, due principally to the difficulty in dissolving or removing iron, and at times due to the cost of reagents, and lack of applicability of the processes to various ores, particularly the more complex ores, and due also to the fact that the reagents dissolve tin as well as the undesired impurities. The dissolving or solution of tin generally increases with the amount of this metal present as a sulphide. In the recovery of tin from its ores, it is desirable to make a tin concentrate of good grade, and to have a chemical process that will fit in well with present milling methods, and one that will be able to treat a heading, middling, concentrate, or tailing. In the heretofore customary methods of treating tin ores, one of the main difficulties has been that of the removal of iron. The ordinary oxidizing or chloridizing roast does not place this element, usually present in the crude ore as pyrite, in such a form as to be readily soluble in commercial solvents, even though such roasts may make it possible to remove the other undesired substances.

In accordance with my present invention, the iron sulphide in such metallurgical products as hereinbefore described are removed to a large extent by heating the product under substantially non-oxidizing conditions, preferably at a temperature that would be considered high in oxidizing roasting, and thereby converting the iron sulphide into a form of iron that can be removed by appropriate solvents. It is probable that the heat-treatment contemplated by the invention involves in effect a conversion of the iron sulphide in the metallurgical product to ferrous sulphide, in which latter form the iron may be removed by such solvents as sulphuric or hydrochloric acids, ferric salts of these acids and the like. During the solution of the iron, hydrogen sulphide may be evolved in sufficient quantity to precipitate any tin or other metal dissolved.

The heating of the metallurgical product to make the iron soluble must be carried out in non-oxidizing atmosphere at a temperature which would be considered high for oxidizing roasting. The type of heating most suitable to make the iron soluble proceeds best when a very small quantity of air is admitted into the heating chamber and the small amount of resultant gases removed. Heavy white sulphurous gases are maintained over the surface of the charge. The admission of air as in ordinary oxidizing roasting is deleterious to the formation of soluble iron compounds. It is necessary to rabble at intervals during the heating. The temperature in the heating chamber is maintained higher than that used in the ordinary oxidizing roasts. The action of the small quantity of air admitted during the heating operation is that of combining with the portion of the elemental sulphur evolved to form sulphur dioxide and sulphur trioxide. Heat is supplied to a large extent from extraneous sources. I have found it advantageous in practicing the invention to use a type of furnace which may be considered a muffled reverbatory furnace where the heat is externally applied to the material being treated, and where the fused material may be easily handled.

In the actual practice of the invention, I have obtained excellent results by the following procedure: Making use of a finely ground product, the temperature in the muffle furnace is maintained at substantially 800° to 850° C. for three hours, with a bed of material substantially two inches thick, followed by a gradual raising of the temperature to 950° C. to 1000° C. during the period of an hour. Care should be exercised during the early stages of the heating to avoid fusion of the product.

After the metallurgical product, containing iron sulphide and other metal compounds, has been properly heat-treated as above described, it will be found that a large percentage of the iron is soluble in sulphuric acid with the evolution of hydrogen sulphide. The hydrogen sulphide evolved at this stage may be used later as a precipitant. If it is desired to reduce or control the evolution of hydrogen sulphide during this leaching step, ferric sulphate may be used instead of the acid or ferric sulphate may be used in conjunction with the acid. When ferric sulphate is used as a solvent, the evolution of hydrogen sulphide is greatly diminished and thus when desired it may be used to control the amount of hydrogen sulphide gas evolved. By the use of a strong hot solution of sulphuric acid, as for instance 15% by volume, enough of the iron is dissolved to lead to the belief that all the pyrite (ferric sulphide—$FeS_2$) reduced in the heat treatment to ferrous sulphide ($FeS$) is dissolved, and that the undissolved iron is probably present as unreduced pyrite. During this leaching operation other substances may also be dissolved to some extent by the solvent.

After dissolving all the iron that is readily soluble in sulphuric acid and forming hydrogen sulphide and ferrous sulphate for subsequent use in the cycle, more of the iron may be put in solution with a ferric salt, either the sulphate or the chloride. The chloride has the advantage of dissolving more lead and the sulphate dissolves less tin.

After the iron has been extracted as above described as completely as possible, the residue may be given an oxidizing roast so as to effect recovery of lead, copper and zinc by leaching with appropriate solvents, say sulphuric acid for the zinc and copper and an acidulated brine, preferably containing a ferric salt, for the lead. A chloridizing roast may be employed in some cases. Often the value of the zinc may be disregarded. Thus, by following the foregoing procedure in the case of a tin ore, the iron may be in solution at the end of the treatment as sulphates, the lead as chloride, the zinc and copper as sulphates or chlorides depending upon the solvents used, and the tin content will be in the residue.

The various metals may be precipitated from their respective solutions by any of the methods commonly employed. For instance, the copper may be precipitated on iron, and the lead on lighter scrap from a hotter solution. In isolated districts smaller amounts of other metals may be often disregarded. Again, the valuable metals may be precipitated separately to some extent by hydrogen sulphide by varying the conditions of acidity and temperature. In treating the more contaminated tin products now made, enough ferrous sulphide is usually present after the primary heat treatment contemplated by the invention to generate all the hydrogen sulphide required for precipitation purposes.

Along with the treatment of the solids as hereinbefore described, the preparation, regeneration and treatment of the leach solutions may be outlined as follows: It is possible to use commercial sulphuric acid from any source, or if desired it is possible to produce this acid from the gases given off in the course of the heat treatment process. The ferric sulphate and the sulphuric acid may be made from ferrous sulphate and heat treatment gases in the manner outlined in United States Patent No. 1,477,965. It is generally advantageous to use hydrogen sulphide as a precipitant with solutions in which the ferric compounds are mostly reduced and which are fairly rich in the metal to be precipitated. The acidity desired to carry out a given precipitation may be obtained by choosing a solution in the cycle having approximately the desired acidity.

After the metallurgical product has been given the non-oxidizing heat treatment and the iron has been removed by leaching with suitable solvents as hereinbefore described, the other ingredients, such as lead and zinc, may be separated or removed by milling methods or combined milling and leaching methods, without employing an oxidizing or chloridizing roast and the subsequent methods of leaching above outlined. For instance, in mixtures of sulphides, of iron, lead and zinc, with or without earthy compounds, tin and the like, after the iron is removed by leaching following a non-oxidizing heat treatment, the lead compounds may be dissolved with ferric chloride, and the little altered zinc sulphide floated. Again, after a similar non-oxidizing heat treatment, followed by removal of the iron by leaching, and when the physical conditions permit, the lead and zinc sulphides may be separated, and removed from the rest of the pulp by the use of flotation methods. Hydrogen sulphide may be used as above described to precipitate any compounds, such as tin, that might be dissolved.

I claim:

1. The process for treating a tin ore or tin concentrate containing sulphide of iron, which comprises heating the material under substantially non-oxidizing conditions.

2. The process for treating a tin ore or tin concentrate containing sulphide of iron, which comprises heating the material under substantially non-oxidizing conditions, to a temperature of substantially 1000° C.

3. The process for treating a tin ore or tin concentrate containing sulphide of iron, which comprises progressively heating the material under substantially non-oxidizing conditions first to a temperature of substantially 800° C. to 850° C. and gradually raising the temperature to substantially 1000° C.

4. The process for treating a tin ore or tin concentrate containing sulphide of iron, which comprises heating the material under substantially non-oxidizing conditions to a temperature of substantially 800° C. to 850° C., maintaining the product at said temperature for substantially three hours, gradually raising the temperature to substantially 1000° C. and maintaining the product at substantially 1000° C. for a period of about one hour.

5. The process for treating a tin ore or tin concentrate containing sulphide of iron, which comprises heating the material under substantially non-oxidizing conditions, and leaching the resulting product with an appropriate solvent.

6. The process for treating a tin ore or tin concentrate containing sulphide of iron, which comprises heating the material under substantially non-oxidizing conditions, and leaching the resulting product with a solution of sulphuric acid.

7. The process for treating a tin ore or tin concentrate containing sulphide of iron, which comprises heating the material under substantially non-oxidizing conditions to a temperature of substantially 1000° C., and leaching the resulting product with an appropriate solvent.

8. The process for treating a tin ore or tin concentrate containing sulphide of iron, which comprises progressively heating the material under substantially non-oxidizing conditions first to a temperature of substantially 800° C. to 850° C., gradually raising the temperature to substantially 1000° C., and leaching the resulting product with an appropriate solvent.

9. The process for concentrating tin ore or tin concentrates which comprises, heating the ore or concentrate, containing iron as sulfides, under substantially non-oxidizing conditions, so controlling the temperature that the iron passes from the form of insoluble sulfide to that of a soluble sulfide, leaching the resulting product to remove the iron and treating the residue for the recovery of tin compounds.

10. The process for concentrating tin ore, which comprises heating the ore under substantially non-oxidizing conditions, subjecting the resulting product to the action of a suitable solvent to dissolve compounds of iron contained therein, roasting the residue, and leaching the roasted residue with a suitable solvent.

11. The process for treating a metallurgical product containing sulphide of iron, which comprises heating the product under substantially non-oxidizing conditions, leaching the resulting product with a suitable acid, roasting the residue under oxidizing conditions, and leaching the product of the oxidizing roast with a suitable solvent.

12. The process for treating a metallurgical product containing sulphide of iron, which comprises heating the product under substantially non-oxidizing conditions, leaching the resulting product with a suitable acid, roasting the residue under oxidizing conditions, and leaching the product of the oxidizing roast with acidulated brine.

13. The process for concentrating tin ore containing iron sulphide, which comprises roasting the ore under substantially non-oxidizing conditions, leaching the roasted product with a suitable acid whereby soluble iron products are dissolved and hydrogen sulphide gas is evolved, roasting the leached residue, leaching the roasted product to dissolve soluble contaminants, and subjecting the solution of contaminants to the action of hydrogen sulphide evolved during the dissolution of the iron products.

14. The process for concentrating tin ore containing sulphide of iron and other contaminants, which comprises heating the ore under substantially non-oxidizing conditions, leaching the resulting product with sulphuric acid whereby soluble iron sulphide is removed and hydrogen sulphide gas is evolved, subjecting the leached residue to an oxidizing roast, leaching the roasted material with acidulated brine to remove soluble contaminants, and utilizing the hydrogen sulphide evolved during the dissolution of iron sulphide as a precipitating agent in the process.

In testimony whereof I affix my signature.

DONALD H. McINTOSH.